(12) United States Patent
Bergamini et al.

(10) Patent No.: US 10,359,113 B2
(45) Date of Patent: Jul. 23, 2019

(54) SEAL ASSEMBLY FOR A VALVE STEM

(71) Applicant: Nuovo Pignone SRL, Florence (IT)

(72) Inventors: Lorenzo Bergamini, Bari (IT);
Vincenzo Pietanza, Bari (IT);
Tommaso Cappiello, Bari (IT)

(73) Assignee: Nuovo Pignone srl, Florence (IT)

( * ) Notice: Subject to any disclaimer, the term of this patent is extended or adjusted under 35 U.S.C. 154(b) by 381 days.

(21) Appl. No.: 14/908,576

(22) PCT Filed: Nov. 24, 2015

(86) PCT No.: PCT/EP2015/077520
§ 371 (c)(1),
(2) Date: Jan. 29, 2016

(87) PCT Pub. No.: WO2016/107702
PCT Pub. Date: Jul. 7, 2016

(65) Prior Publication Data
US 2017/0292606 A1    Oct. 12, 2017

(30) Foreign Application Priority Data
Dec. 29, 2014 (IT) .............................. MI2014A2265

(51) Int. Cl.
*F16J 15/00* (2006.01)
*F16J 15/18* (2006.01)
(Continued)

(52) U.S. Cl.
CPC ........... *F16J 15/004* (2013.01); *F16J 15/185* (2013.01); *F16J 15/186* (2013.01); *F16J 15/46* (2013.01);
(Continued)

(58) Field of Classification Search
CPC ........ F16J 15/183; F16J 15/185; F16J 15/186; F16J 15/406; F16K 41/003; F16K 41/02; F16K 41/04
See application file for complete search history.

(56) References Cited

U.S. PATENT DOCUMENTS 2,504,936 A * 4/1950 Payne ...................... F16J 15/14
                                                                    264/266
3,955,822 A    5/1976 Irby
(Continued)

FOREIGN PATENT DOCUMENTS

EP    0454322 A1    10/1991
WO    9216776 A1    10/1992

OTHER PUBLICATIONS

Italian Search Report and Written Opinion dated Aug. 14, 2015 which was issued in connection with IT Patent Application No. MI2014A002265 which was filed on Dec. 29, 2014.

*Primary Examiner* — Nicholas L Foster
(74) *Attorney, Agent, or Firm* — Baker Hughes Patent Operations

(57) ABSTRACT

A seal assembly for a valve stem comprises an external seal placed on a valve stem facing an external environment; an internal seal placed on the valve stem facing a process environment; the external and internal seals define a chamber for the containment of barrier fluid; the chamber has an inlet configured to be placed into fluid communication with a source of barrier fluid; a detector of the amount of barrier fluid; a pressurizer device for providing the chamber with a positive pressure with respect to the process environment; the pressurizer device is configured to be installed coaxially with the valve stem.

16 Claims, 5 Drawing Sheets

(51) Int. Cl.
*F16J 15/46* (2006.01)
*F16J 15/48* (2006.01)
*F16K 41/00* (2006.01)
*F16K 41/04* (2006.01)

(52) U.S. Cl.
CPC ............ *F16J 15/48* (2013.01); *F16K 41/003* (2013.01); *F16K 41/04* (2013.01)

(56) References Cited

U.S. PATENT DOCUMENTS

| | | | |
|---|---|---|---|
| 4,972,867 A | | 11/1990 | Ruesch |
| 5,056,757 A | | 10/1991 | Wood |
| 5,056,758 A | | 10/1991 | Bramblet |
| 5,129,624 A | | 7/1992 | Icenhower et al. |
| 5,345,812 A | | 9/1994 | Haboian |
| 5,346,136 A | * | 9/1994 | Bassett ................... F01L 3/085 239/533.2 |
| 5,365,971 A | | 11/1994 | Bergamini |
| 5,607,165 A | * | 3/1997 | Bredemeyer .......... F16J 15/406 277/320 |
| 6,161,835 A | * | 12/2000 | Arbuckle ............ F16J 15/3296 277/320 |
| 2004/0227302 A1 | | 11/2004 | Burdick et al. |
| 2007/0120084 A1 | * | 5/2007 | Stumbo .................. F16J 15/004 251/214 |
| 2007/0120085 A1 | | 5/2007 | Gessaman |
| 2008/0047616 A1 | | 2/2008 | Lovell et al. |
| 2013/0061954 A1 | | 3/2013 | Glove et al. |
| 2018/0051684 A1 | * | 2/2018 | Bergamini ............ F04B 39/041 |

* cited by examiner

SEAL ASSEMBLY FOR A VALVE STEM

BACKGROUND

Embodiments of the present invention relate to a seal assembly for a valve stem. Such seal assembly is used in particular to prevent leaks of process fluid which is toxic or harmful to the environment.

A seal assembly of this type is known in the art. For example, document US 2004/0227302 shows a dynamic sealing arrangement for preventing leakage of a fluid along a shaft. Such arrangement comprises multiple seals which hold pressurized barrier fluid. According to one aspect, at least three seals are arranged along the shaft with pressurized barrier fluid between the first and second seals. A collection area is provided between the second and third seals to collect any leakage that might occur. Collected leakage, if any, is ported to an output port. According to another aspect, a unitary seal block member is provided that supports the dynamic sealing arrangement for the shaft and defines a piston chamber and a drilled passageway connecting the piston chamber and barrier sealant pressurization chamber between two seals.

Indeed, in such sealing arrangement the piston has a process surface, exposed to the process fluid, and an internal surface, which is in contact with the barrier fluid inside the chamber. The piston also comprises a stem which is exposed to the external environment. As a consequence of this arrangement, the pressure from the process fluid is sufficient to pressurize the barrier fluid to a pressure higher than the process pressure, since it acts on a bigger surface (the process surface is equal to the sum of the internal surface plus the cross section of the stem).

BRIEF DESCRIPTION OF THE INVENTION

A first aspect of the present invention relates to a seal assembly for a valve stem. Such seal assembly comprises an external seal, which is adapted to be placed on a valve stem facing an external environment. The seal assembly also comprises an internal seal which is adapted to be placed on the valve stem facing a process environment. The external and internal seals define in cooperation with each other a chamber for the containment of barrier fluid. Specifically, such chamber is provided with an inlet configured to be placed into fluid communication with a source of barrier fluid.

The seal assembly also comprises a detector of the amount of barrier fluid inside the chamber and/or in a reservoir in fluid communication with the chamber. A pressurizer device is configured to provide the chamber with a positive pressure with respect to the process environment. In particular, the detector is associated with the pressurizer and is configured to detect the amount of barrier fluid inside the chamber and/or inside the reservoir, where it is present. The pressurizer is configured to be installed coaxially with the valve stem.

In an embodiment, this aspect is more compact and has fewer components than the prior art, thus being more reliable. Also the piston in the prior art, because of the working principle that is based on, has to be partially exposed to the external atmosphere, thus it needs an additional seal between the piston and the external environment. Such seal is not present in this embodiment of the invention.

According to another aspect of the invention, the pressurizer further comprises a piston at least partially defining the chamber. The piston has a process surface configured to contact the process environment. The piston also has an internal surface configured to contact the barrier fluid. The detector is configured to detect the pressure difference between the process surface and the internal surface of the piston.

More particularly, it is possible to obtain a precise measure of the remaining quantity of barrier fluid. Indeed, such quantity is correlated to the position of the piston, which is directly derivable from the pressure difference.

BRIEF DESCRIPTION OF THE DRAWINGS

Further details and specific examples will refer to the attached drawings, in which.

DETAILED DESCRIPTION

Figure 1:
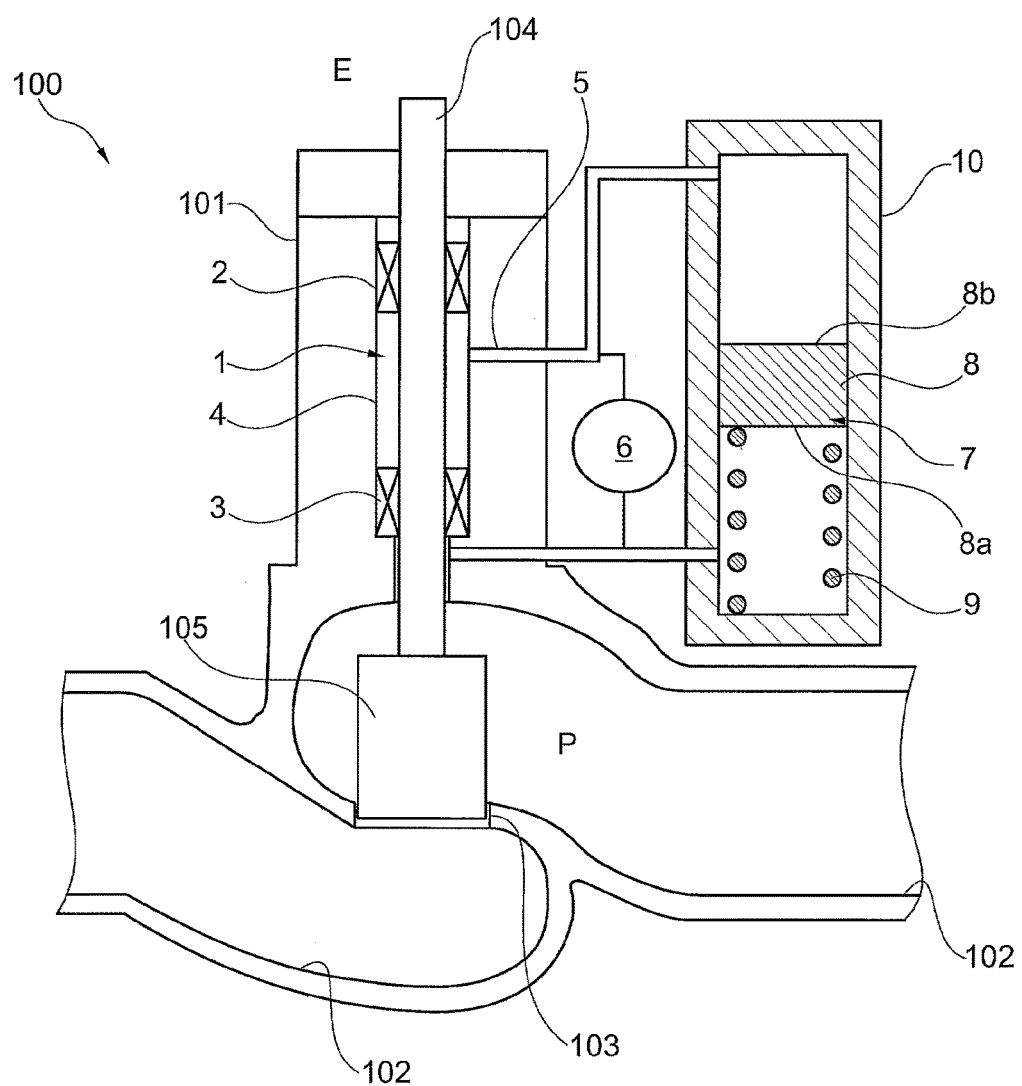
FIG. 1 is a schematic side view of a seal assembly according to a first example of the present invention, installed in a valve.

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Therefore in the attached drawings with the number 1 will be indicated a seal assembly for a valve stem according to an embodiment of the present invention.

Such seal assembly 1 is configured to be installed onto a valve 100, which will therefore also be briefly described. Indeed, such valve 100 comprises a main body 101 which holds two ports 102. A seat 103 is placed between the two ports 102.

With more detail, a stem 104 is inserted into the main body 101. A member 105 is attached to the stem 104. The member 105 can move in/out of the seat 103 in order to open and close the valve 100.

Also, reference will be made to a process environment "P" which, during operation, contains or is directly in contact with a process fluid, and an external environment "E" which is typically an environment which must be kept uncontaminated from process fluid. An example of an external environment "E" can be an atmospheric pressure environment where there is human presence directly exposed to the environment.

The seal assembly 1 comprises an external seal 2, which is adapted to be placed on the stem 104 facing the external environment "E". Indeed, the external seal 2 is placed between the main body 101 of the valve 100 and the stem 104.

The seal assembly 1 also comprises an internal seal 3, which is also adapted to be placed on the stem 104 facing the process environment "P". More detail about the internal seal 3 will be given in a following part of the present disclosure.

The external 2 and internal seals 3 define in cooperation with each other a chamber 4 for the containment of barrier fluid. The chamber 4 has an inlet 5, which is configured to be placed into fluid communication with a source of barrier fluid "S". Such source "S" can be either a reservoir 10 of barrier fluid or a nipple 11 which is used to periodically replenish the barrier fluid inside the chamber 4.

With more detail, the chamber 4 is defined between the stem 104 and the main body 101. Therefore, the chamber 4 has an annular shape and is coaxial with respect to the stem 104 of the valve 100. Moreover, please note that in the embodiment of FIG. 1 the chamber 4 has a fixed volume. On the other hand, in FIGS. 2-4 the chamber 4 has a variable volume. In this case, the amount of barrier fluid available inside the seal assembly 1 is in direct correlation with the volume of the chamber 4.

For this reason, the seal assembly 1 also comprises a detector 6 of the amount of barrier fluid inside the chamber 4, if the chamber has a variable volume, and/or in the reservoir 10 if the chamber 4 volume is fixed. More detail about the detector 6 will be given in a following part of the disclosure.

A pressurizer device 7 is configured to provide the chamber 4 with a positive pressure with respect to the process environment. In particular, the detector 6 is associated with the pressurizer 7. According to the embodiment shown in FIGS. 1 and 5, the detector 6 is configured to detect the amount of barrier fluid inside the reservoir 10. On the other hand, according to the embodiments of FIGS. 2-4, the detector 6 is configured to detect the amount of barrier fluid inside the chamber 4. In other words, when the chamber 4 has a variable volume the detector 6.

Figure 2:
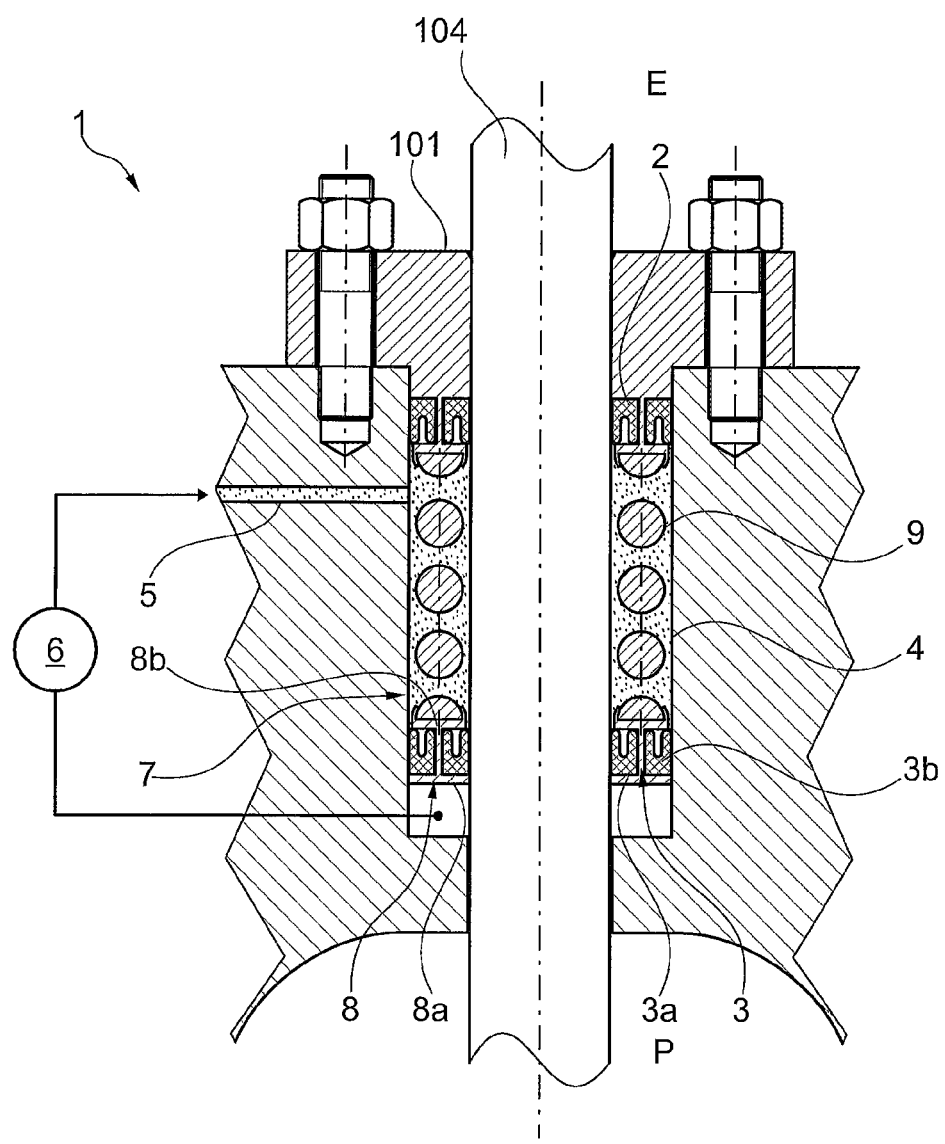
FIG. 2 is a sectional view of a seal assembly according to a second example of the present invention.
Figure 3:
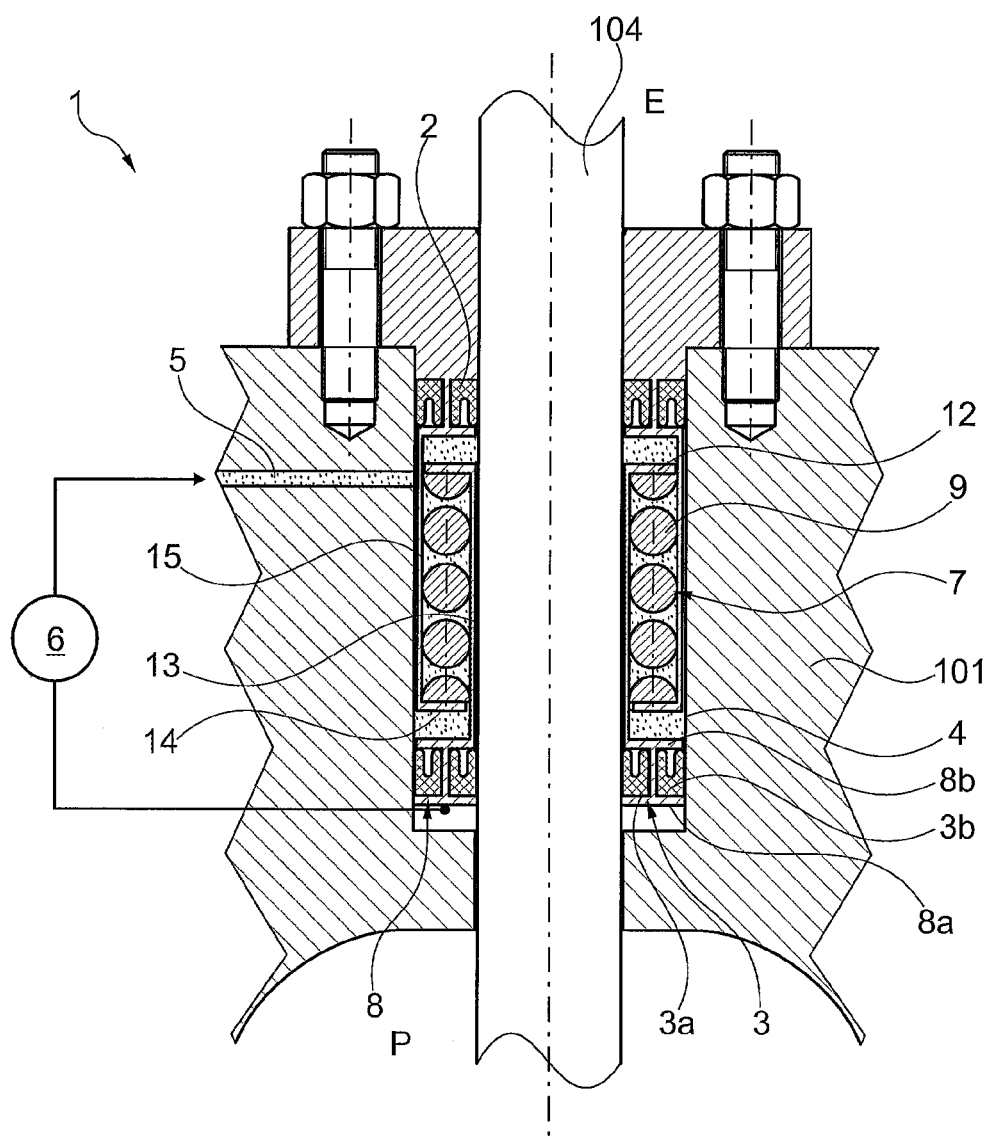
FIG. 3 is a sectional view of a seal assembly according to a third example of the present invention.
Figure 4:
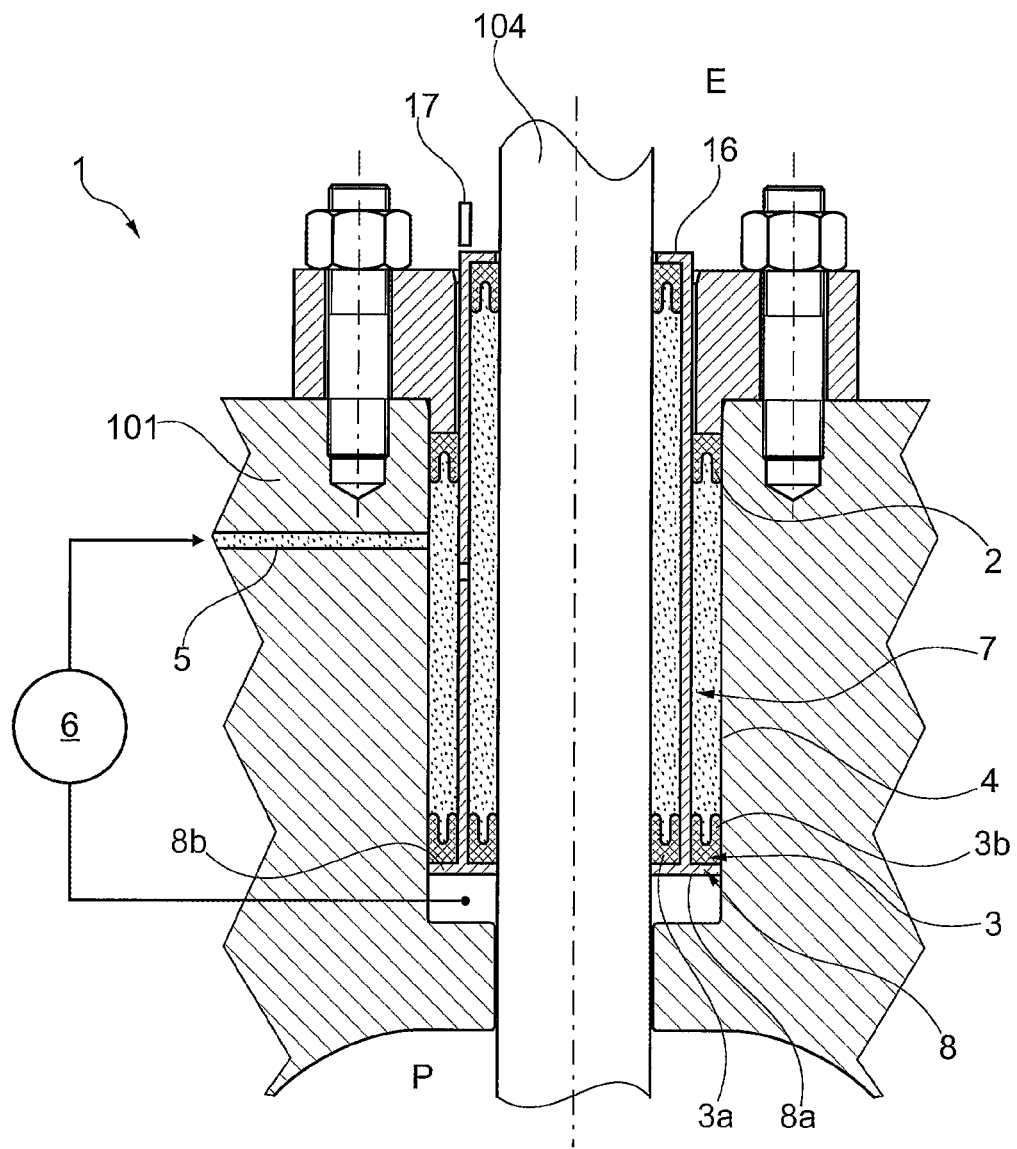
FIG. 4 is a sectional view of a seal assembly according to a fourth example of the present invention.

As shown in FIGS. 2-4, the pressurizer 7 is more particularly configured to be installed coaxially with the valve stem 104. On the other hand, please note that in principle the pressurizer can also be installed in a non-coaxial way with respect to the stem 104, as shown for example in FIG. 1. In this case, the pressurizer 7 is installed inside the reservoir 10. In any case, the pressurizer 7 provides a positive pressure difference between the chamber 4 and the pressure environment "P". In other words, during normal operation the pressure of the barrier fluid inside the chamber 4 is higher than the pressure of the process fluid inside the process environment "P", so as to prevent any leak of process fluid toward the chamber 4.

With additional detail, the pressurizer 7 comprises a piston 8. The piston 8 has the purpose of applying an additional force to the barrier fluid in order to keep it at a high enough pressure. In particular, the piston 8 has a process surface 8a configured to contact the process environment "P". The piston 8 has an internal surface 8b, which is configured to contact the barrier fluid.

According to the embodiments of the invention shown in FIGS. 2-4, the piston 8 at least partially defines the chamber 4. Therefore, in this case the internal surface 8b of the piston 8 also partially defines the chamber 4. Accordingly, the internal seal 3 comprises a first internal seal 3a placed between the piston 8 and the stem 104. Also, the internal seal 3 comprises a second internal seal 3b between the piston 8 and the main body 101 of the valve 100.

In the embodiment of FIG. 1 the piston 8 is inserted inside the reservoir 10, and pushes the barrier fluid inside the chamber 4.

With additional detail, in the embodiments shown in FIGS. 1-3 the pressurizer 7 comprises a spring 9 acting on the piston 8. The spring 9 is configured to provide a force on the piston 8 which adds to the process pressure. Specifically, in FIG. 1 the spring 9 is applied on the process surface 8a of the piston 8 and, more particularly, on a wall of the reservoir 10. The spring 9 is compressed when the reservoir 10 is filled with barrier fluid, thus ensuring the proper application of elastic force on the piston 8 in the direction of the barrier fluid itself.

In the embodiments of FIGS. 2 and 3, the spring 9 is placed inside the chamber 4. In particular, the spring 9 is placed coaxially with respect to the stem 104. In these cases, the spring 9 applies its elastic force on the internal surface 8b of the piston 8. The spring is also connected to the outward surface of the chamber 4, part of the main body 101 of the valve 100.

Referring now specifically to the embodiment of FIG. 2, please note that the spring 9 is preloaded when the chamber 4 is filled with barrier fluid. In other words, the inflow of barrier fluid inside the chamber 4 pushes the piston 8 toward the process environment "P", thus pre-extending the spring 9. The result of this preload is the application of elastic force onto the piston 8 as explained above.

With regard to the embodiment of FIG. 3, the pressurizer 7 comprises a flange 12 attached to the piston 8. The flange 12 is positioned so that it faces the internal surface 8b of the piston 8. With additional detail, the pressurizer 7 comprises a distancing element 13, inserted into the chamber 4 and attached to both the flange 12 and the piston 8. As a result, the flange 12, the piston 8 and the distancing element 13 move as a single block inside the valve 100. Additionally, a further flange 14 is attached to the main body 101, itself attached to a further distancing element 15. The further flange 16 is also inserted into the chamber 4, specifically between the piston 8 and the flange 12. In this case, the spring 9 is inserted between the flange 12 and the further flange 14.

In operation, when the chamber 4 is filled with barrier fluid, the piston 8 expands, the flange 12 and the further flange 14 are pushed closer together and thus the spring 9 is compressed. The spring 9 then applies its elastic force to the flange 12 by pushing back onto the further flange 14 which is fixed. As a result, the elastic force from the spring 9 is applied on the flange 12.

According to the embodiments shown in FIGS. 1-3, the detector 6 is configured to detect the pressure difference between process surface 8a of the piston 8 and the internal surface 8b. Indeed, since the pressure difference in these embodiments is provided by the spring 9, it is possible to correlate it to the amount of barrier fluid remaining inside the seal assembly 1. Therefore, as this pressure difference approaches zero, it will become necessary to refill the seal assembly 1 with barrier fluid.

Specifically, in the embodiment of FIG. 1 the pressure difference is correlated to the position of the piston 8 and thus to the amount of barrier fluid still present in the reservoir 10. Similarly, in the embodiments shown in FIGS. 2-3 the pressure difference is again related to the position of the piston 8, but in this case it is directly proportional to the volume of the chamber 4.

In other embodiments, the detector 6 is able to detect the position of the piston 8 directly. One possibility of doing this is shown in FIG. 4. In this case, there is no spring, and the pressure difference is given by exposing to the external environment a cap 16 attached to the piston 8. A sensor 17, able to detect the displacement, is placed on the cap 16. The sensor 17 itself can be of any kind known the person skilled in the art.

Figure 5:
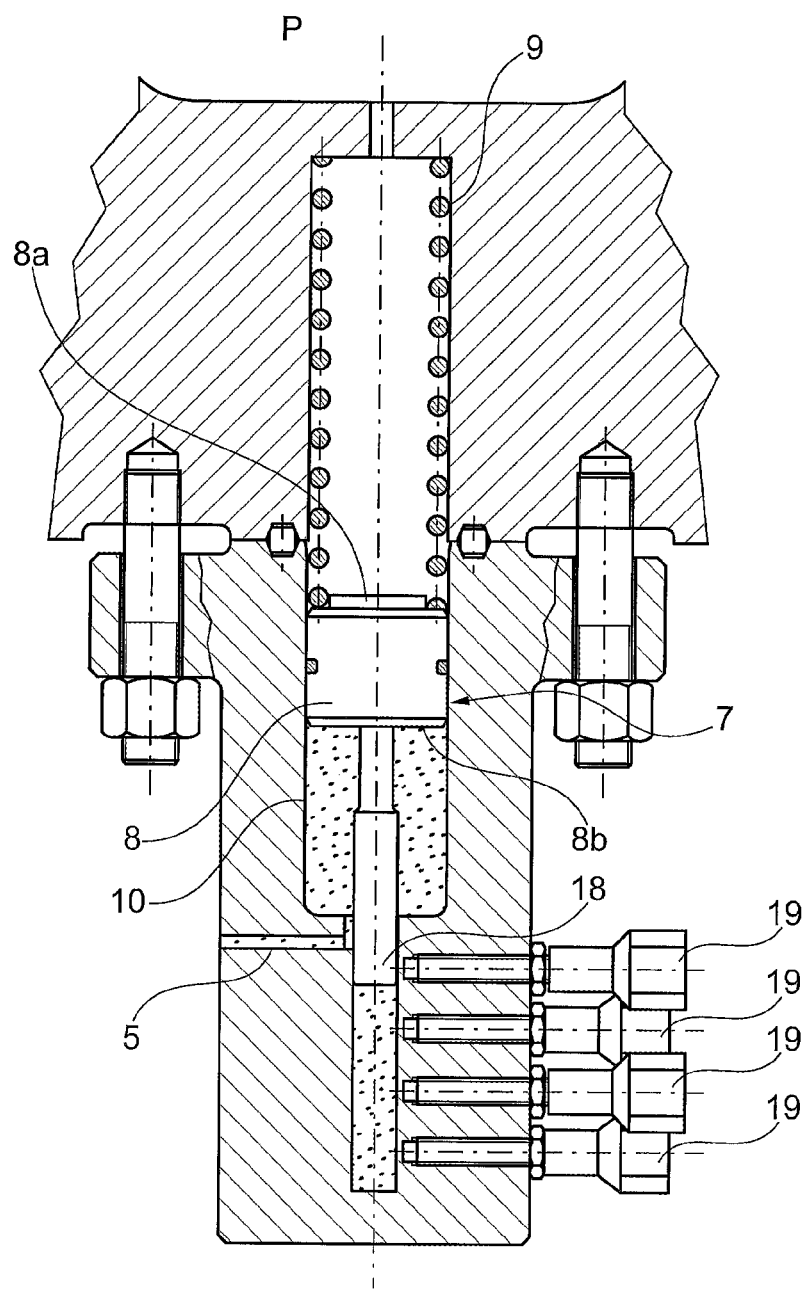
FIG. 5 is a sectional view of a detail of a variant of the seal assembly of FIG. 1.

According to the embodiment shown in FIG. 5, the detector 6 comprises a magnet 18 fixed on the piston 8. A plurality of proximity switches 19 are installed on the main body 101 of the valve 100, facing the chamber 4 and configured to interact with the magnet 18.

Specifically, the proximity switches 19 are positioned on the part of the chamber 4 in which the piston 8 moves.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seal assembly for a valve stem, comprising:
   an external seal placed on a valve stem facing an external environment;
   an internal seal placed on said valve stem facing a process environment; said external and internal seals defining, in cooperation with each other, a chamber for the containment of barrier fluid; said chamber having an inlet configured to be placed into fluid communication with a source of barrier fluid;
   a detector connected between the inlet of the chamber and the process environment, the detector detecting an amount of the barrier fluid inside said chamber; and
   a pressurizer device configured to provide said chamber with a positive pressure with respect to said process environment,
   wherein the pressurizer device comprises a piston at least partially defining said chamber, said piston having a process surface contacting the process environment and an internal surface contacting the barrier fluid, and
   wherein the detector detects the amount of the barrier fluid inside the chamber by detecting a pressure difference between the process surface and the internal surface of the piston.

2. The seal assembly according to claim 1, wherein said internal seal comprises a first internal seal placed between said piston and said valve stem.

3. The seal assembly according to claim 1, wherein said pressurizer device comprises a spring acting on said piston and configured to provide a force on said piston which adds to the process pressure.

4. The seal assembly according to claim 3, wherein said force is applied on the internal surface of said piston.

5. The seal assembly according to claim 3, wherein the spring is configured to be extended by the inflow of barrier fluid inside said chamber.

6. The seal assembly of claim 1, wherein the pressurizer device is installed coaxially with said valve stem.

7. A valve comprising:
   a seat;
   a valve stem inserted into said seat; and
   a seal assembly comprising:
   an external seal placed on the valve stem facing an external environment;
   an internal seal placed on said valve stem facing a process environment; said external and internal seals defining, in cooperation with each other, a chamber for the containment of barrier fluid; said chamber having an inlet configured to be placed into fluid communication with a source of barrier fluid;
   a detector connected between the inlet of the chamber and the process environment, the detector detecting an amount of the barrier fluid inside said; and
   a pressurizer device configured to provide said chamber with a positive pressure with respect to said process environment;
   wherein said seal assembly is installed onto said valve stem,
   wherein the pressurizer device comprises a piston at least partially defining said chamber, said piston having a process surface contacting the process environment and an internal surface contacting the barrier fluid, and
   wherein the detector detects the amount of the barrier fluid inside the chamber by detecting a pressure difference between the process surface and the internal surface of the piston.

8. The seal assembly according to claim 2, wherein said pressurizer device comprises a spring acting on said piston and configured to provide a force on said piston which adds to the process pressure.

9. The seal assembly according to claim 4, wherein the spring is configured to be extended by the inflow of barrier fluid inside said chamber.

10. The valve of claim 7, wherein the pressurizer device is installed coaxially with said valve stem.

11. The valve according to claim 7, wherein said internal seal comprises a first internal seal placed between said piston and said valve stem.

12. The valve according to claim 7, wherein said pressurizer device comprises a spring acting on said piston and configured to provide a force on said piston which adds to the process pressure.

13. The valve according to claim 12, wherein said force is applied on the internal surface of said piston.

14. The valve according to claim 12, wherein the spring is configured to be extended by the inflow of barrier fluid inside said chamber.

15. The valve according to claim 11, wherein said pressurizer device comprises a spring acting on said piston and configured to provide a force on said piston which adds to the process pressure.

16. The valve according to claim 15, wherein the spring is configured to be extended by the inflow of barrier fluid inside said chamber.

* * * * *